(12) United States Patent
Ravaglia

(10) Patent No.: US 9,313,955 B2
(45) Date of Patent: Apr. 19, 2016

(54) SAFETY DEVICE FOR AGRICULTURAL MACHINES

(71) Applicant: KVERNELAND GROUP RAVENNA S.R.L., Russi (IT)

(72) Inventor: Paolo Ravaglia, Bagnacavallo (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 0 days.

(21) Appl. No.: 14/365,827

(22) PCT Filed: Dec. 12, 2012

(86) PCT No.: PCT/IB2012/057232
§ 371 (c)(1),
(2) Date: Jun. 16, 2014

(87) PCT Pub. No.: WO2013/088365
PCT Pub. Date: Jun. 20, 2013

(65) Prior Publication Data
US 2014/0305763 A1  Oct. 16, 2014

(30) Foreign Application Priority Data
Dec. 15, 2011  (IT) .............................. BO2011A0716

(51) Int. Cl.
*A01D 75/18* (2006.01)
*A01F 21/00* (2006.01)

(52) U.S. Cl.
CPC ...................................... *A01F 21/00* (2013.01)

(58) Field of Classification Search
CPC ......... A01F 21/00; A01F 29/16; A01D 75/18; A01D 2075/203; A01D 75/187; A01D 34/828
USPC .............................................. 192/149; 188/31
See application file for complete search history.

(56) References Cited

U.S. PATENT DOCUMENTS

| 3,092,226 A | 6/1963 | Williamson | |
| 3,367,460 A * | 2/1968 | Wanner ........................... | 192/24 |

(Continued)

FOREIGN PATENT DOCUMENTS

| FR | 2856758 A1 | 12/2004 |
| WO | 2004039142 A1 | 5/2004 |

OTHER PUBLICATIONS

International Search Report dated Apr. 9, 2013 for International Application No. PCT/IB2012/057232 filed Dec. 12, 2012, 3 pages.

(Continued)

*Primary Examiner* — Robert Hodge
*Assistant Examiner* — Ryan Dodd
(74) *Attorney, Agent, or Firm* — Brooks Kushman P.C.

(57) ABSTRACT

A safety device for agricultural machines is provided. The safety device includes a stop element, which can be associated functionally with a kinematic transmission chain interposed between a motor assembly of a working shaft and the working shaft itself to control the working shaft with the complementary stop element. The stop element is movable on command from a passive configuration to an active configuration, in which the stop element is arranged so as to interfere with the trajectory of the complementary stop element, for the forced locking of the latter and of the working shaft, and vice versa. Moreover, either or both of the stop element and the complementary stop element are associated with a unit for damping the forced locking, which can be actuated automatically upon impact of the stop element against the complementary stop element.

12 Claims, 11 Drawing Sheets

(56) References Cited

U.S. PATENT DOCUMENTS 4,154,406 A       5/1979  Nickel et al.
4,296,591 A  *  10/1981  Martenas et al. ............... 56/10.3
4,323,136 A       4/1982  van der Lely et al.
5,921,071 A  *   7/1999  Paquet et al. .................. 56/16.6

OTHER PUBLICATIONS

Italian Search Report dated Aug. 6, 2012 for Italian Application No. B02011/A000716 filed Dec. 15, 2011, 8 pages.

* cited by examiner

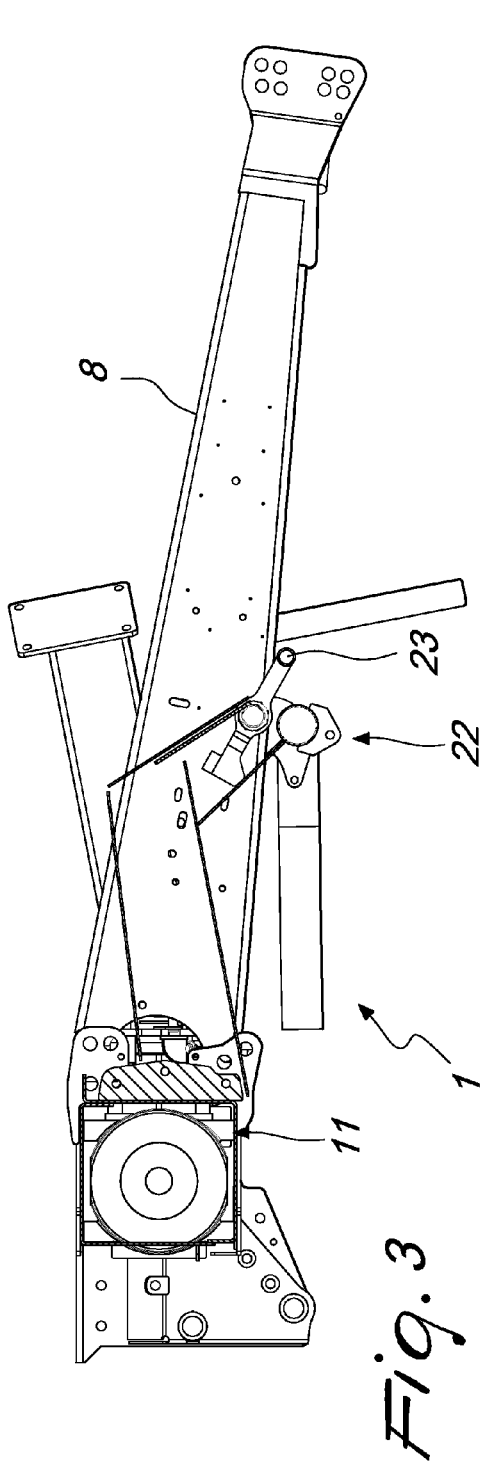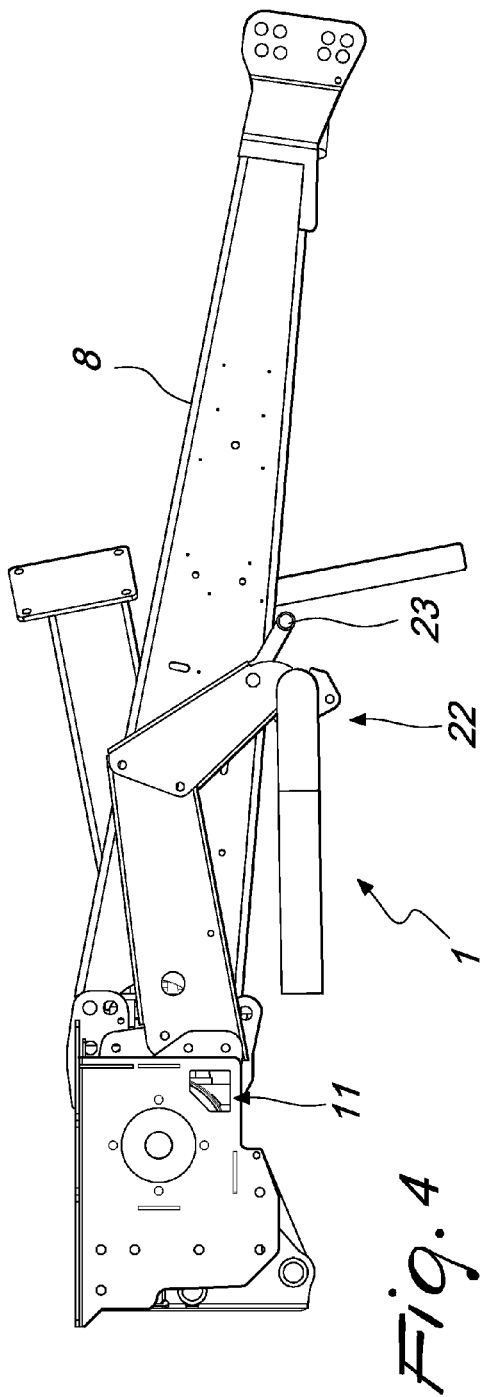

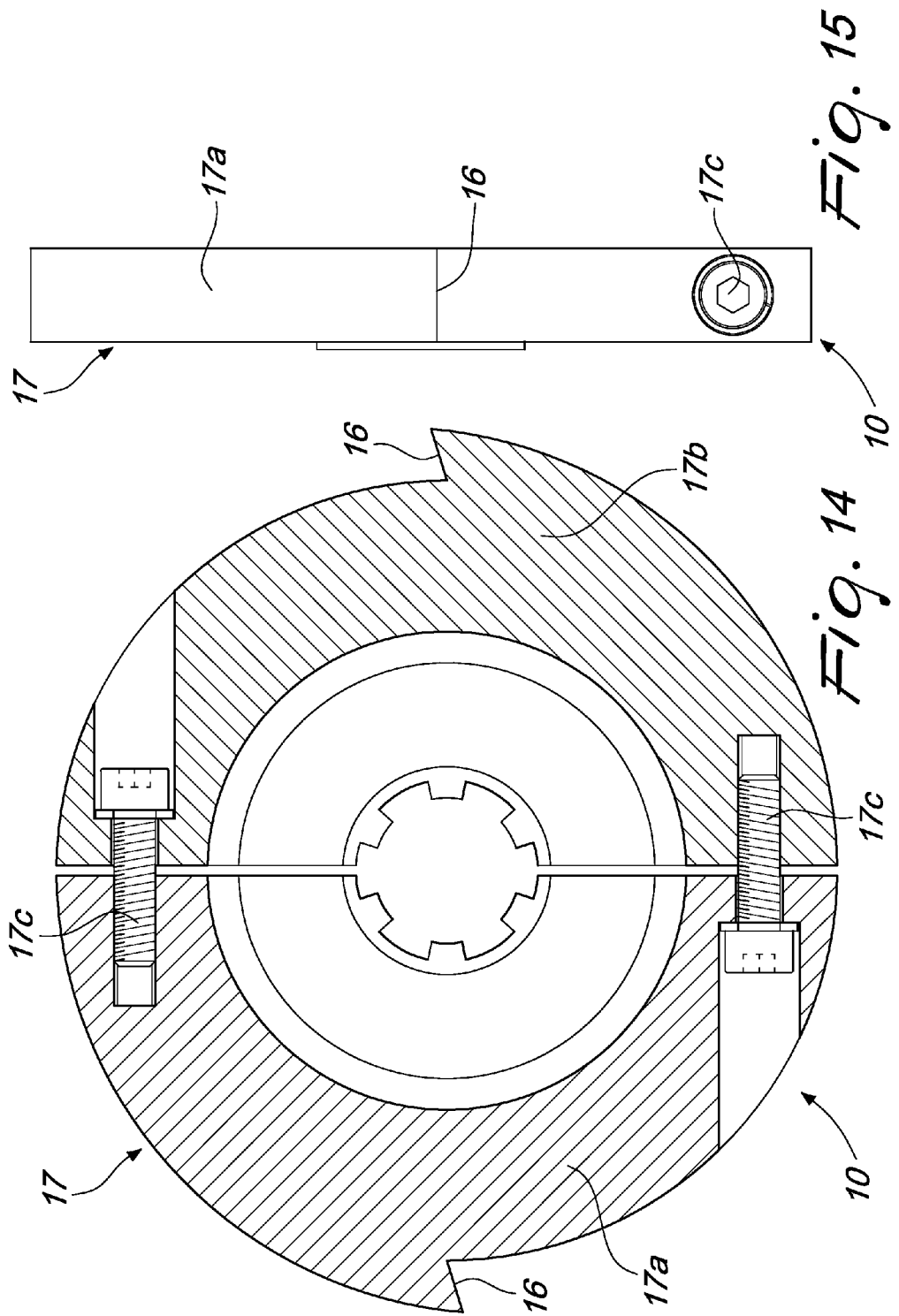

SAFETY DEVICE FOR AGRICULTURAL MACHINES

CROSS-REFERENCE TO RELATED APPLICATION

This application is the U.S. national phase of PCT Application No. PCT/IB2012/057232 filed on Dec. 12, 2012, which claims priority to Italian Patent Application No. BO2011A000716 filed on Dec. 15, 2011, the disclosures of which are incorporated in their entirety by reference herein.

The present invention relates to a safety device for agricultural machines, and the related agricultural machine.

As is known, in the agricultural sector the use of machines of various types is frequent, which are controlled by an operator and are provided with autonomous means for traction or are drawn by respective tractors or similar motor vehicles of various types, and are capable of carrying out the various activities necessary to work in the fields.

Thus machines are widespread which are adapted for plowing, sowing, threshing, harvesting, spraying the fields with fertilizing substances, pesticides or the like, etc.

Among other things, in the above-mentioned sector machines are often used, known as balers, which are adapted for harvesting, optionally shredding, and baling, materials such as straw, hay, forage and the like, destined for various uses (such as, for example, equine, ovine and bovine fodder).

Balers are thus capable of moving (autonomously, or drawn by a tractor or similar vehicle) along the field on which the above-mentioned materials are distributed, and they are provided, at the front according to the direction of travel, with an apparatus for collecting these materials, which is typically constituted by a shaft that rotates about an axis parallel to the ground and is provided with a plurality of teeth capable of collecting and lifting the hay, the straw, the forage etc.

The material thus gathered is then repositioned on a central feeding channel, thanks to the action of a pair of mutually opposite screw feeders, which are arranged parallel to the axis of the rotating shaft (and surmounting the latter). The material can moreover be affected by the action of another rotor (or other feeder device), which is for example capable of pressing it or shredding it further, before it is sent to the chamber (usually arranged at the rear) in which the bale is formed, typically (but not exclusively) circular in shape.

Such implementation solution is not however devoid of drawbacks.

During normal operation, the possibility sometimes arises that an occasional excessive accumulation of material, at a transversal portion of the rotating shaft, results in the jamming, and sudden locking, of the latter.

Faced with such an eventuality, often the operator who is controlling and driving the baler (or the vehicle drawing it), interrupts the operation of the vehicle and personally takes care of clearing the jam.

In order to do this, he or she approaches the rotating shaft and, using the hands or more commonly by extending a foot, shifts the material, seeking to free the affected portion of the shaft from the material accumulated therein, which blocks the rotation.

Sometimes however, in order to restore normal working conditions in as short a time as possible, the operator imprudently tries to shift the material without having first preventively stopped the transmission of power to the rotating shaft and to the other functional assemblies of the baler (or other agricultural machine).

Thus if the action of removal of the jam has a positive outcome, there will be an immediate resumption of the rotary motion of the shaft, and, if the operator does not take the utmost care, the risk is greater that he or she is injured (possibly mortally) by the teeth of the shaft and/or ingested toward the chamber, with obvious lethal consequences.

Safety elements are therefore known which instantly stop any resumption of the rotary motion of the shaft, but, precisely because they perform the function of arresting the elements in motion forcedly, and suddenly, they subject the latter to violent, and unwanted, stresses.

The aim of the present invention is to solve the above-mentioned problems, by providing a device for agricultural machines which enables an operator to safely remedy an accidental jamming of the rotating shaft, designed for the treatment of the materials, if he or she has not preventively disabled the transmission of power to the functional assemblies of the agricultural machine, without subjecting the components of the machine to excessive stresses.

Within this aim, an object of the invention is to provide an agricultural machine that enables an operator to safely intervene in the event of jamming of the rotating shaft, designed for the treatment of the materials, if he or she has not preventively disabled the transmission of power to the functional assemblies of the agricultural machine, without subjecting the components of the machine to excessive stresses.

Another object of the invention is to provide a safety device that can be actuated in a convenient manner by the operator.

Another object of the invention is to provide a safety device that ensures a high reliability of operation.

Another object of the invention is to provide a safety device that can be installed on existing agricultural machines and/or with assigned components.

Another object of the invention is to provide a safety device that can be easily implemented using elements and materials that are readily available on the market.

Another object of the invention is to provide a safety device that is low-cost and safe in application.

This aim and these and other objects are achieved by a safety device for agricultural machines, comprising an apparatus for treating materials of the type of agricultural products, which is provided with at least one rotating working shaft, which faces the ground and is proximate thereto and is provided with means for treating the materials, characterized in that it comprises a stop element and a complementary stop element, which can be associated functionally with a kinematic transmission chain interposed between a motor assembly of the working shaft and said working shaft, in order to control the working shaft with said complementary stop element, said stop element being movable on command from a passive configuration, in which said stop element is spaced from said complementary stop element, for the free rotation of the working shaft, to an active configuration, in which said stop element is arranged so as to interfere with the trajectory of said complementary stop element, for the forced locking of said complementary stop element and of the working shaft, and vice versa, either or both of said stop element and said complementary stop element being associated with a unit for damping the forced locking, which can be actuated automatically upon impact of said stop element against said complementary stop element.

This aim and these and other objects are also achieved by an agricultural machine, comprising an apparatus for treating materials of the type of agricultural products, which is provided with at least one rotating working shaft, which faces the ground and is proximate thereto and is provided with means for treating the materials, characterized in that it has a safety device, which comprises a stop element and a complementary stop element, which is functionally associated with a kinematic transmission chain interposed between a motor assembly of said working shaft and said working shaft, in order to control said working shaft with said complementary stop element, said stop element being movable on command from a passive configuration, in which said stop element is spaced from said complementary stop element, for the free rotation of said working shaft, to an active configuration, in which said stop element is arranged so as to interfere with the trajectory of said complementary stop element, for the forced locking of said complementary stop element and of said working shaft, and vice versa, either or both of said stop element and said complementary stop element being associated with a unit for damping the forced locking, which can be activated automatically upon impact of said stop element against said complementary stop element.

Further characteristics and advantages of the invention will become more apparent from the description of a preferred, but not exclusive, embodiment of the safety device and of the agricultural machine according to the invention, which is illustrated by way of non-limiting example in the accompanying drawings wherein:

FIG. 3 is a sectional view of FIG. 2 along the line III-III;

FIG. 4 is a side view of the safety device according to the invention;

FIG. 14 is a cross-sectional view, along a frontal plane, of the complementary stop element in FIG. 13;

FIG. 15 is a side view of the complementary stop element in FIG. 13;

Figure 1:
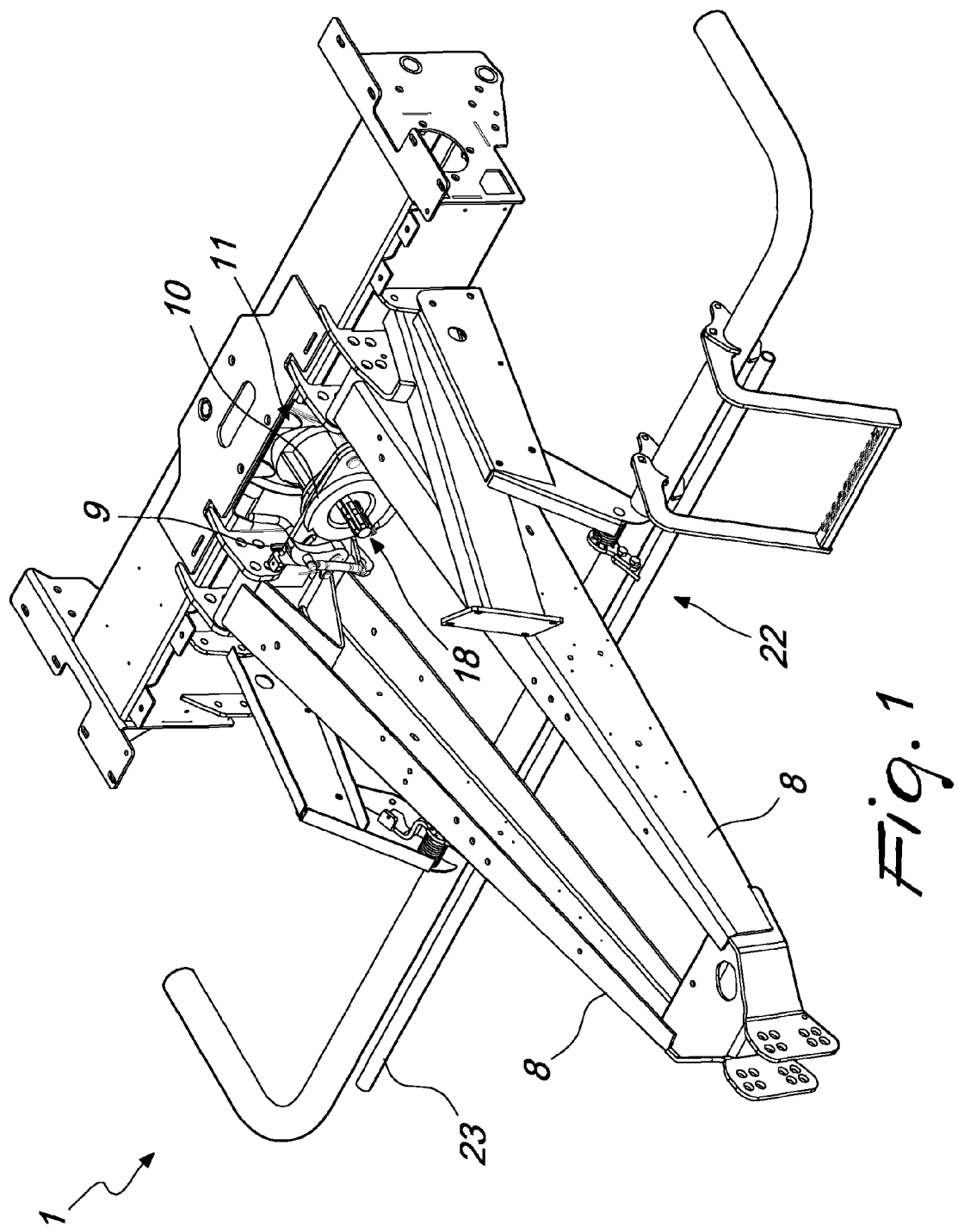
FIG. 1 is a three-quarters front perspective view of the safety device according to the invention, seen from above.
Figure 2:
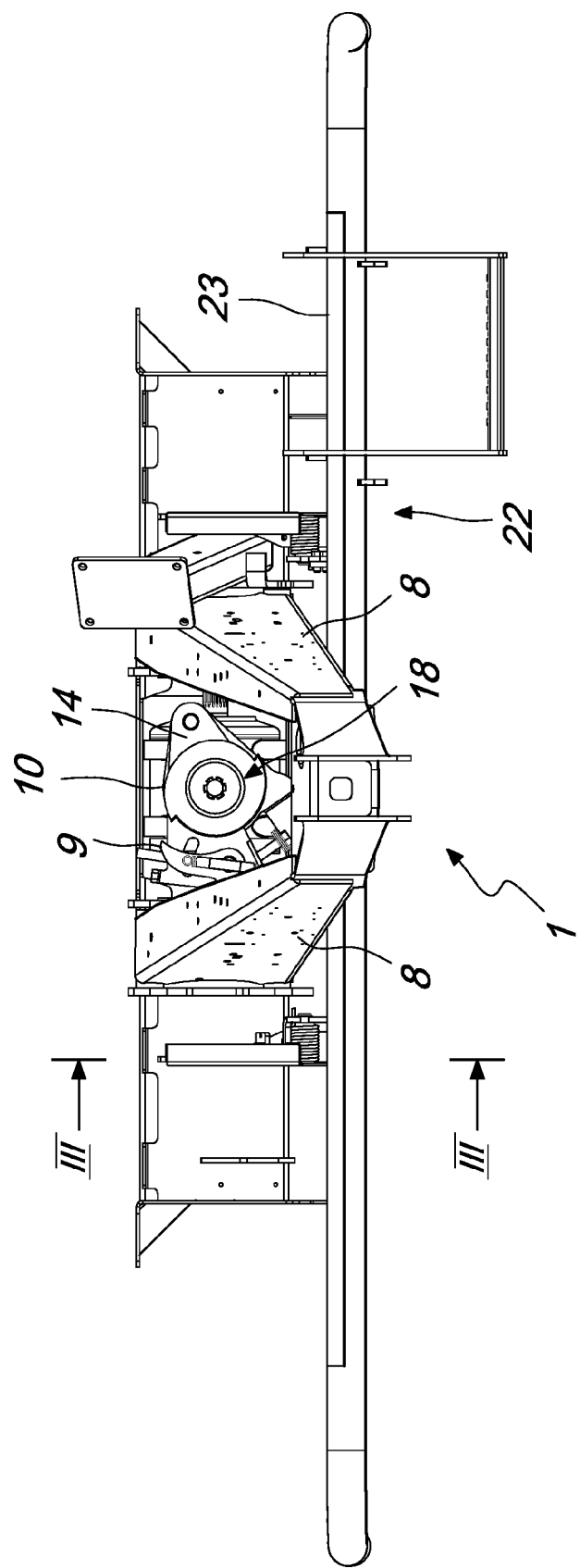
FIG. 2 is a front elevation view of the safety device.
Figure 5:
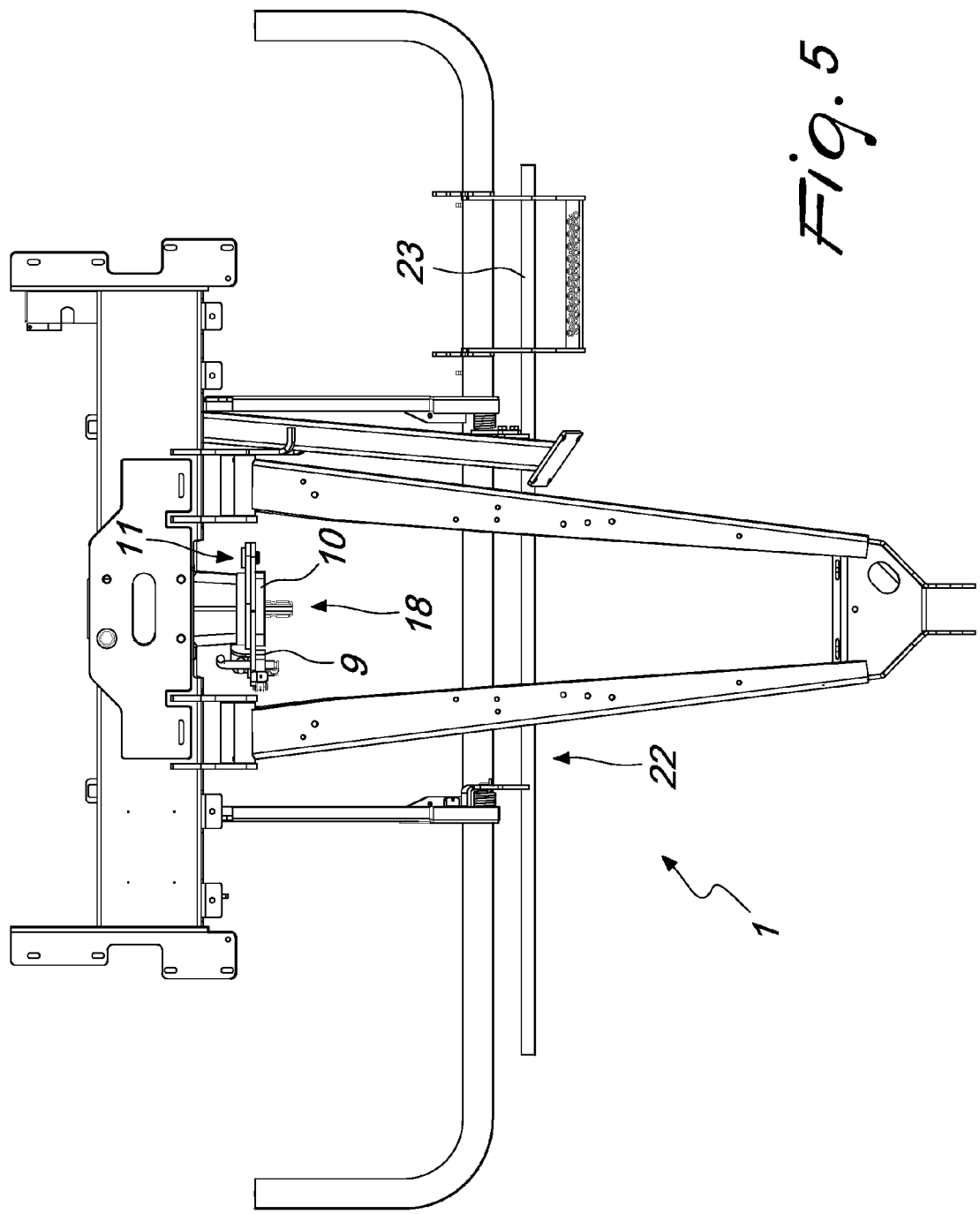
FIG. 5 is a view of the safety device according to the invention, seen from above.
Figure 6:
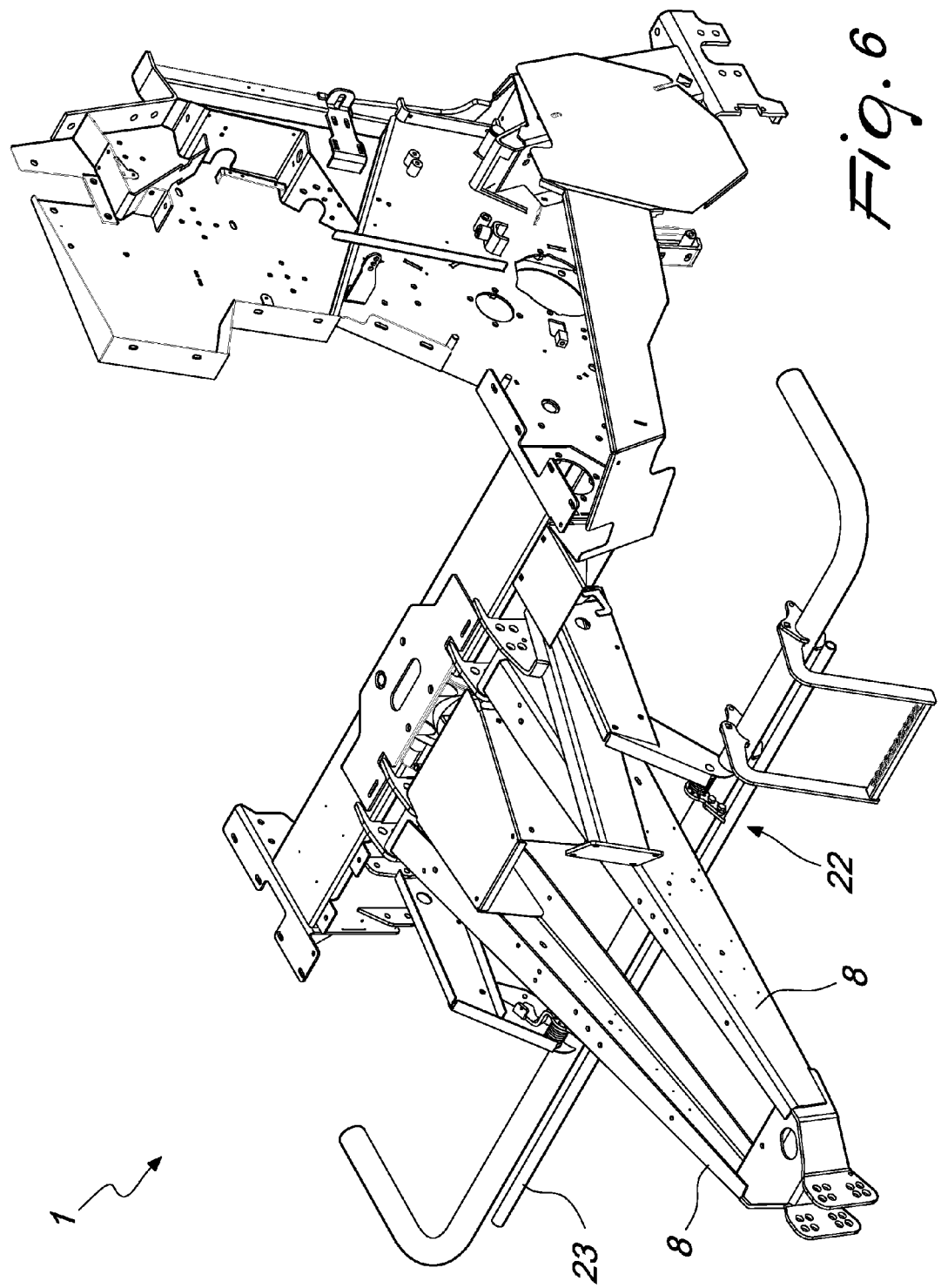
FIG. 6 is a three-quarters front perspective view of the safety device according to the invention, seen from above and showing some components of the agricultural machine on which it is installed.
Figure 7:
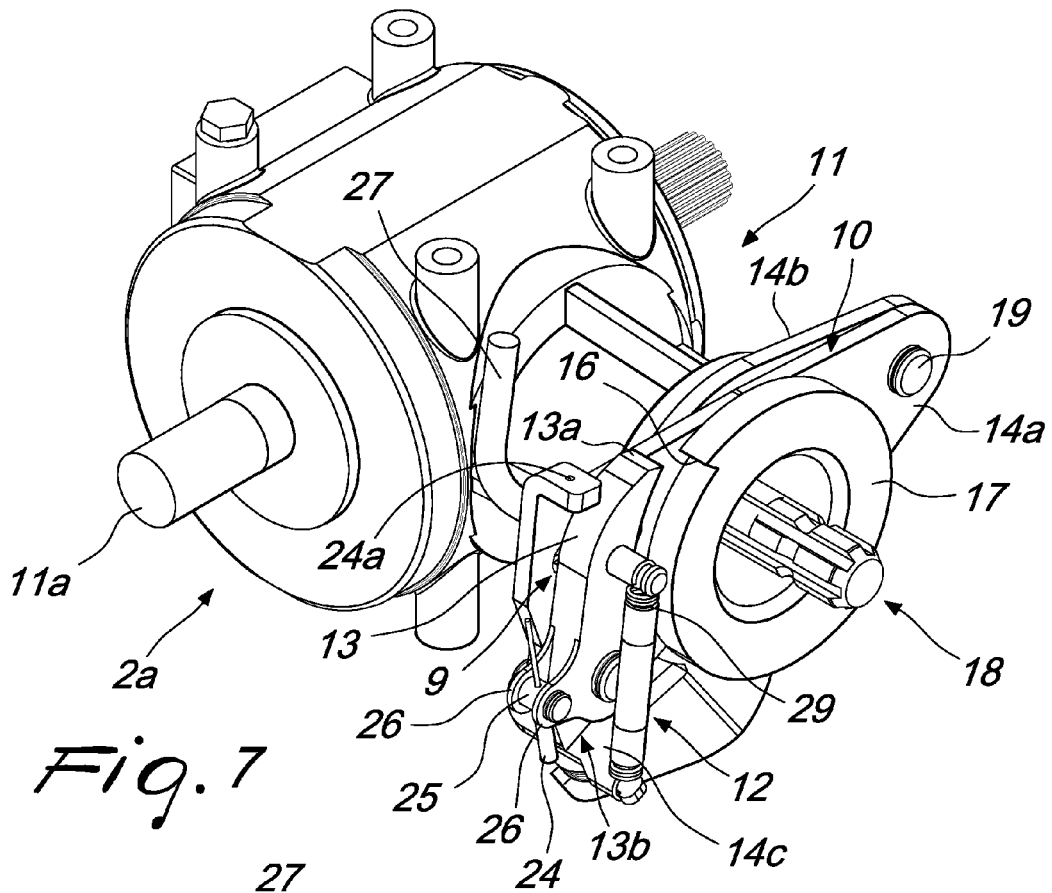
FIG. 7 is a three-quarters front perspective view of a detail of the safety device according to the invention, seen from above.
Figure 8:
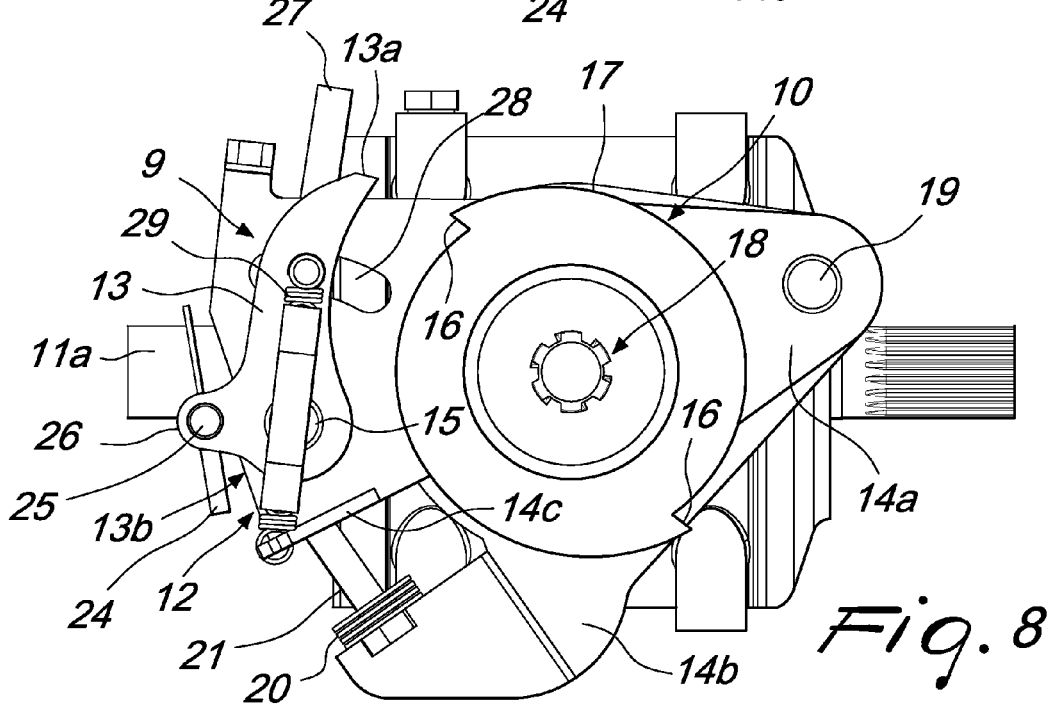
FIG. 8 is a front elevation view of the detail in FIG. 7.
Figure 9:
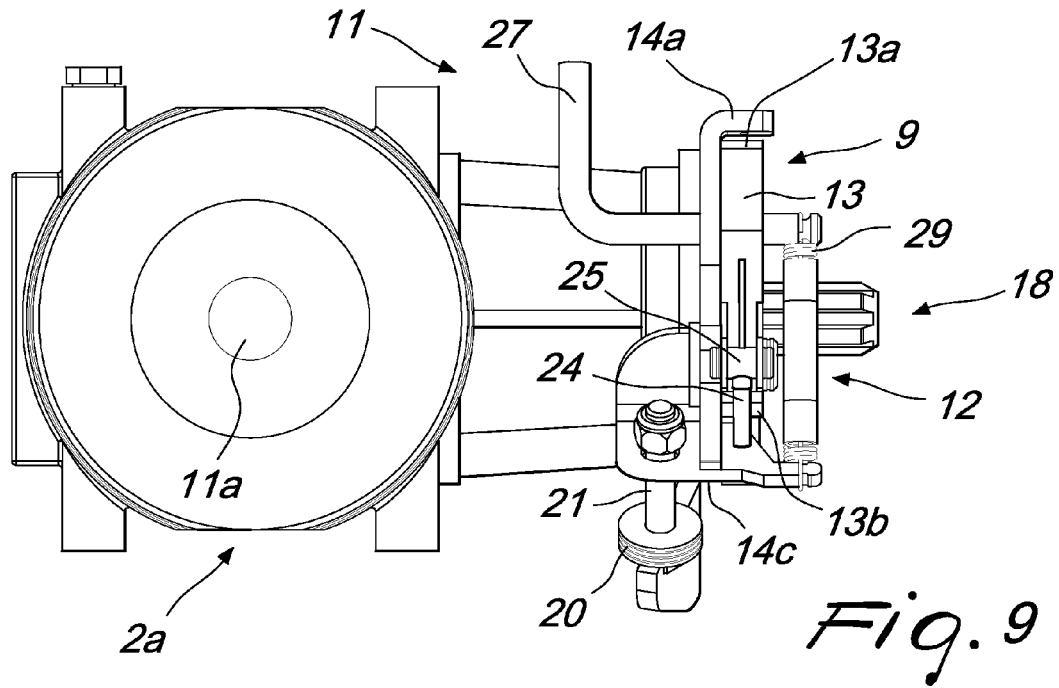
FIG. 9 is a side view of the detail in FIG. 7.
Figure 10:
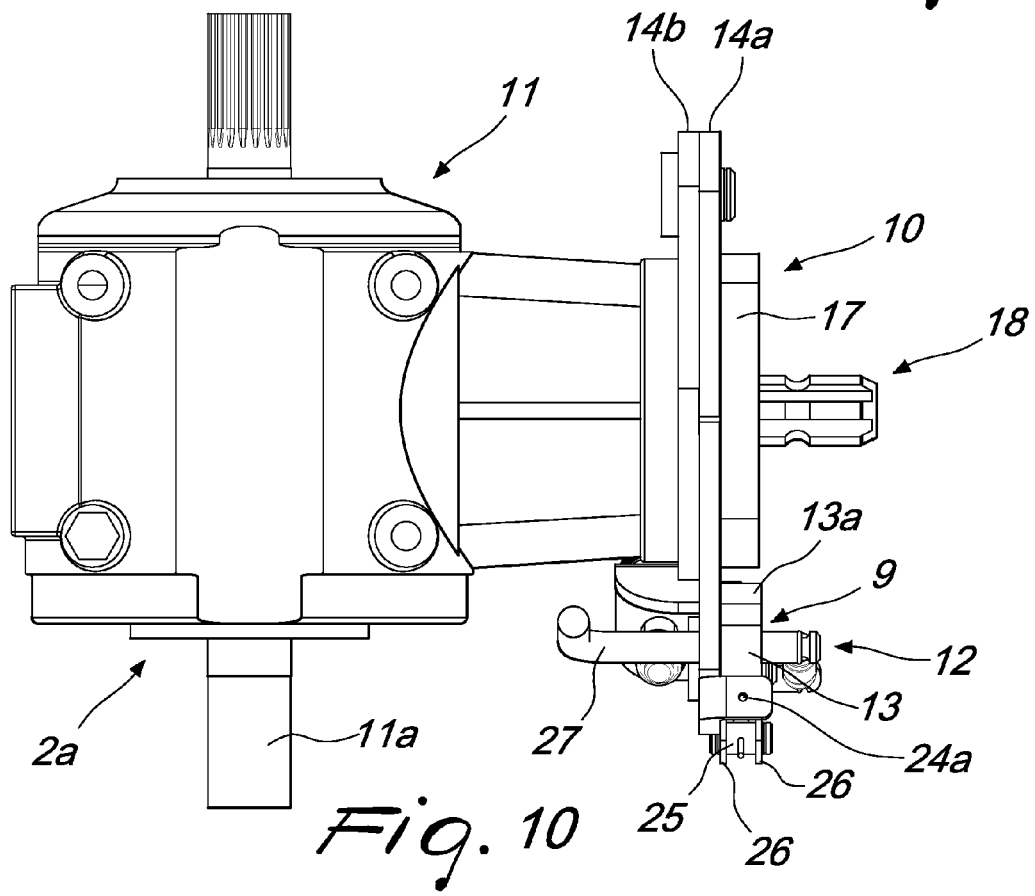
FIG. 10 is a view from above of the detail in FIG. 7.
Figure 11:
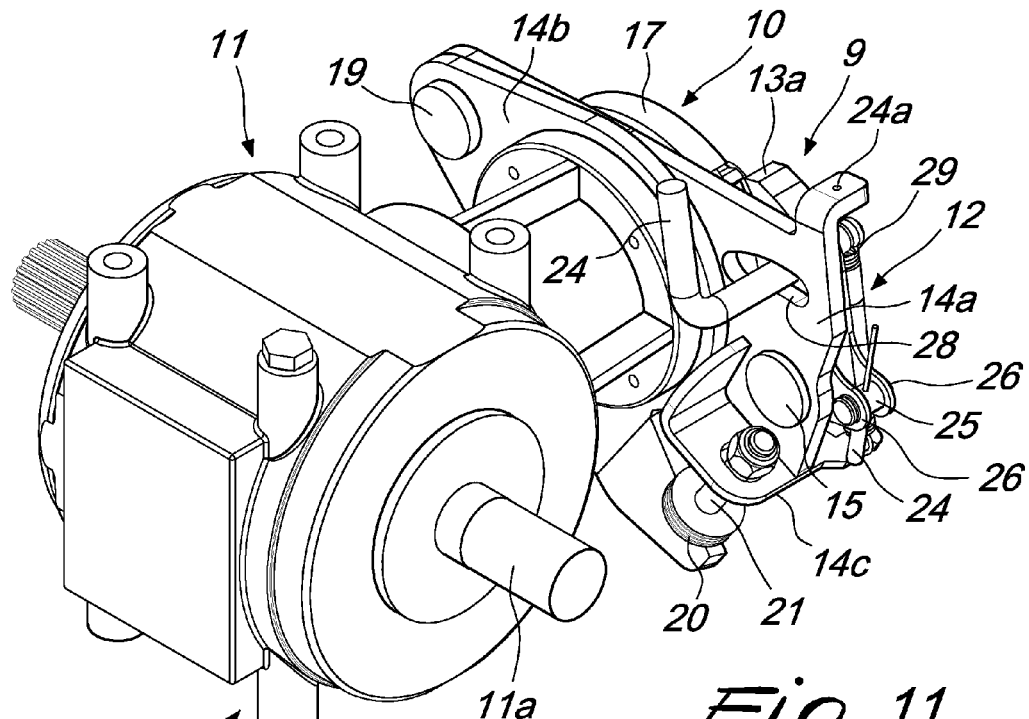
FIG. 11 is a three-quarters rear perspective view of the detail in FIG. 7, seen from above.
Figure 12:
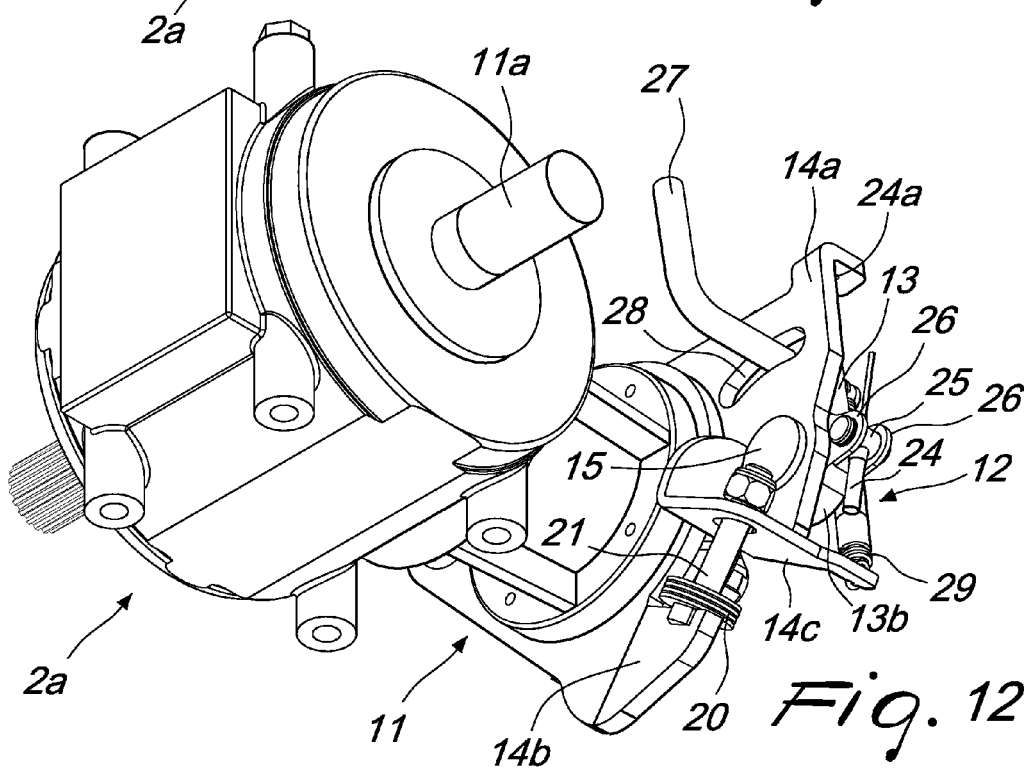
FIG. 12 is a three-quarters rear perspective view of the detail in FIG. 7, seen from below.

With reference to the figures, the safety device according to the invention, generally designated by the reference numeral 1, is adapted (preferably, but not exclusively) to be installed on agricultural machines 2, of the type comprising an apparatus for the treatment 3 of materials of the type of agricultural products, which is provided with at least one rotating working shaft 4, which in turn faces the ground and is proximate thereto and is provided with means for treatment 5 of the materials.

It should be noted from this point onward that according to the preferred, but not exclusive, application of the present invention, the agricultural machine 2 is of the type of balers and the like, and is adapted for harvesting materials such as hay, straw and forage, by way of the above-mentioned apparatus 3, and subsequently dispatching and pressing them, by way of a conveyor assembly which is typically provided with mutually opposite screw feeders, surmounting the apparatus 3, and with other rotors for pressing and shredding, to a chamber for forming 6 the bale, which is arranged at the rear of the apparatus 3.

Thus according to such preferred application, the working shaft 4 is arranged parallel to the ground (and at right angles to the advancement direction of the machine 2) and is provided with means for treatment 5 which are constituted by a plurality of teeth 7, which are capable of collecting and lifting the straw and hay which the machine 2 progressively encounters during its advance.

With further reference to the preferred application, the agricultural machine 2 is intended to be drawn by a tractor or other motorized vehicle, to which the machine 2 can be stably anchored thanks to brackets 8 or other engagement elements.

It should be noted that the possibility is not ruled out (while remaining within the scope of protection claimed herein) of installing the device 1 according to the invention on other types of agricultural machines 2 (including machines provided with independent motor drives) or in different sectors of application, according to specific requirements.

According to the invention, the safety device 1 comprises a stop element 9, which is moveable on command from a passive configuration to an active configuration, and vice versa, and a complementary stop element 10, which can be functionally associated with a kinematic transmission chain 11 interposed between a motor assembly of the working shaft 4 and the working shaft 4 itself, so as to control the latter with the complementary stop element 10.

In the passive configuration (which is the one in which the device 1 is shown in the accompanying figures), the stop element 9 is spaced from the complementary stop element 10, so as to allow the free rotation of the complementary stop element 10 and of the working shaft 4.

Vice versa, in the active configuration, the stop element 9 is arranged so as to interfere with the trajectory of the complementary stop element 10, so as to cause, according to methods which will be better described hereinbelow, the forced locking of the complementary stop element 10 and, consequently, of the working shaft 4.

Moreover, either or both of the stop element 9 and the complementary stop element 10 are associated with a unit 12 for damping the above-mentioned forced locking (of the complementary stop element 10 and of the working shaft 4, but more generally of all the functional assemblies arranged downstream of the complementary stop element 10), which can be actuated automatically upon impact of the stop element 9 with the complementary stop element 10, so as to deaden that impact and protect against the danger of subjecting the elements in play to violent stresses, thus achieving the set aim.

According to an embodiment of important practical interest, cited by way of non-limiting illustration of the application of the invention, the stop element 9 is constituted substantially by an arm 13, which can be articulated to a supporting plate 14a about a first pivot 15 and which can thus oscillate from the passive configuration, in which the arm 13 is spaced from the complementary stop element 10, to the active configuration, and vice versa.

In the active configuration, a first end portion 13a of the arm 13, substantially opposite to the first pivot 15, is arranged along the stroke of at least one shoulder 16, which protrudes externally from a rotating disk 17, which substantially constitutes the complementary stop element 10 and which can be keyed on the output shaft of the power take-off 18 of the agricultural machine 2: the output shaft is comprised in the above-mentioned kinematic transmission chain 11 and is thus also adapted for the transmission of the motion to the working shaft 4, for example by means of a subsequent main transmission shaft 11a, which is arranged downstream of the output shaft and associated with it by way of adapted gearwheels.

As is known in fact, the power take-off 18 is the element by way of which the engine of the tractor or of another motorized vehicle (to which, according to the solution proposed and described herein, by way of non-limiting example, the machine 2 can be anchored thanks to the brackets 8) is capable of actuating the various functional assemblies that operate on the agricultural machine 2 which is coupled to it, by way of a mechanical, rotary movement, and thanks to a cardan transmission shaft.

Thus in the active configuration, the stop element 9 is capable of forcibly arresting the rotation of the complementary stop element 10 (of the disk 17), and thus the rotation of the output shaft of the power take-off 18, thus interrupting the transmission of power to all the functional assemblies of the machine 2, including, as noted, the working shaft 4.

More specifically, in the solution proposed in the accompanying figures, the disk 17 has a pair of shoulders 16, which are formed by opposite parts of its circumferential edge: in this manner, a rotation of the disk 17, when the arm 13 is arranged in the active configuration, brings one of the shoulders 16 into abutment against the first end portion 13a, with consequent forced locking of the disk 17 and, as a consequence, of the working shaft 4.

So in fact, when the arm 13 is arranged in the active configuration, the disk 17 is only allowed a rotation that is equal to the angular distance between two consecutive shoulders 16 provided on its edge.

The possibility is not ruled out, while remaining within the scope of protection claimed herein, of providing disks 17 which are provided with a different number of shoulders 16, according to specific applicative requirements (also of different sizes and shapes), precisely in order to vary the stroke permitted to the disk 17 before its definitive arrest.

Conveniently, the above-mentioned supporting plate 14a is articulated to a fixed body of the agricultural machine 2 about a second pivot 19: at the abutment (impact) of one of the shoulders 16 with the first end portion 13a, the plate 14a and the arm 13 (before their forced arrest) are thus pulled by the disk 17 so as to oscillate (about the second pivot 19) up to a stroke limit, with which the forced locking of the disk 17 is achieved.

The damping unit 12 thus comprises at least one elastic element, which is associated with the arm 13, the elastic reaction of which contrasts the above-mentioned stroke so as to attenuate the forced locking of the working shaft 4 and of the other functional assemblies associated with the kinematic chain 11 and/or arranged downstream of the power take-off 18.

It should be noted that the fixed body to which the plate 14a is articulated can be, in a first embodiment, an element of the kinematic chain 11, such as a reduction gear 2a which is interposed between the output shaft and the main transmission shaft 11a.

According to a different embodiment, as shown in the accompanying figures, the plate 14a is articulated to a reference complementary plate 14b, which can be fixed to the chassis of the machine 2 and with respect to which the plate 14a can thus rotate (in oscillation).

According to an embodiment of important practical interest, cited by way of non-limiting illustration of the application of the invention, such elastic element is constituted substantially by at least one Belleville spring 20, which is fitted along a column 21, which is fixed with its base (which defines the above-mentioned stroke limit) to the fixed body of the agricultural machine 2 (for example, again, to the reduction gear 2a or to the complementary plate 14b) and is inserted slideably, at the opposite end, in a hole provided in a transverse wing 14c, which protrudes from both sides of the plate 14a.

With further reference to the solution proposed above, the damping unit 12 can be constituted by a plurality of Belleville springs 20, stacked on each other and fitted along the column 21, so as to ensure an optimal elastic reaction, according to specific design and dimensioning requirements.

It should be noted moreover that the possibility is not ruled out, while remaining within the scope of protection claimed herein, of providing devices 1 in which the damping unit 12 is of a different type, being for example constituted by different springs or other elastic elements, variously arranged, or even by viscous elements, friction elements or shock absorbers of different types.

Conveniently, the safety device 1 according to the invention comprises an actuation element 22, which can be activated by an operator, for commanding the transition of the stop element 9, and thus of the arm 13, from the passive configuration to the active configuration.

In particular, the actuation element 22 comprises a bar 23 which oscillates between a first limit position and a second limit position: such bar 23 can be arranged in front of the working shaft 4 and parallel thereto (as in the solution proposed, by way of non-limiting example, in the accompanying figures). The bar 23 is functionally associated, by way of respective transmission means, including conventional means, with the arm 13, in such a way that a pressure exerted thereupon, in order to make it oscillate from the first limit position to the second position, correspondingly causes the transition of the arm 13 from the passive configuration to the active configuration.

In particular, according to the embodiment proposed in the accompanying figures, by way of non-limiting example, the above-mentioned transmission means comprise a cable 24 (only partially shown in the accompanying figures), which is associated with the bar 23. Such cable 24 can be inserted in a containment sheath and inserted in a slot 24a which is provided in a protrusion that extends at right angles from the plate 14a; the sheath is then fixed, at the opposite end, to a second end portion 13b of the arm 13, which is opposite to the first end portion 13a.

Even more specifically, as can be seen for example in FIGS. 7, 8, 11 and 12, in order to fix it to the second end portion 13b, the cable 24 is stably inserted in a cylindrical block 25 which is supported by two appendages 26 that extend from the second end portion 13b of the arm 13.

Positively, the safety device 1 according to the invention comprises a lever 27, which protrudes transversely from the arm 13, for example through a contoured slot 28 which is provided along the plate 14a and is thus capable of guiding the arm 13 during its transition from the passive configuration to the active configuration, and vice versa.

When the motor assembly of the agricultural machine 2 is deactivated, and the power output by the power take-off 18 is thus interrupted, the lever 27 can then be gripped manually by an operator for commanding the transition of the arm 13 from the active configuration to the passive configuration, with consequent restoration of the possibility of rotation of the working shaft 4 (since the arm 13 is once again spaced from the disk 17).

The agricultural machine according to the invention, designated with 2, comprises an apparatus 3 for treating materials of the type of agricultural products, which is provided with at least one rotating working shaft 4, which faces the ground and is proximate thereto and is provided with means 5 for treating the materials.

According to the invention, the agricultural machine 2 has a safety device 1, which comprises a stop element 9 and a complementary stop element 10, wherein such complementary stop element 10 can be associated functionally with a kinematic transmission chain 11 interposed between a motor assembly of the working shaft 4 and the working shaft 4 itself, so as to control the working shaft 4 with the complementary stop element 10.

The stop element 9 is movable on command from a passive configuration, in which it is spaced from the complementary stop element 10, in order to enable the free rotation of the working shaft 4, to an active configuration, in which the stop element 9 is arranged so as to interfere with the trajectory of the complementary stop element 10, for the forced locking of the complementary stop element 10 and of the working shaft 4, and vice versa.

Moreover, either or both of the stop element 9 and the complementary stop element 10 are associated with a unit 12 for damping the forced locking, which can be actuated automatically upon impact of the stop element 9 against the complementary stop element 10.

The operation of the safety device according to the invention is as follows.

If a jamming of the working shaft 4 occurs (caused for example by an unwanted and excessive accumulation of straw, hay and the like, between the teeth 7), which is such as to cause the arrest of the rotation of the working shaft 4, even with the power output still active, an operator can manually intervene to remove such jamming, after having actuated the safety device 1 according to the invention.

He or she in fact can approach the working shaft 4 and press, in a manner that is safely convenient and easy, the bar 23, which is conveniently arranged in front of the working shaft 4, so that it is pressed immediately, and almost automatically.

The actuation of the bar 23 makes it possible to avoid the risk that, should the operator not have preventively (and imprudently) cut the transmission of power from the power take-off 18, an abrupt reactivation of the working shaft 4 could cause injury (possibly lethal) to the operator.

In fact, pressing of the bar 23 causes, thanks to the cable 24, the oscillation of the arm 13 (normally arranged in a passive configuration) about the first pivot 15: during the oscillation in the slot 28 provided in the plate 14a (in which the lever 27 which is fixed to the arm 13 slides), the arm 13 is brought, with its first end portion 13a, progressively closer to the disk 17, until it rests on its edge, in the active configuration.

Optionally, it is also possible to use a locking spring 29, which is anchored with its fixed end to the wing 14c (at the side opposite to the column 21) and associated at the opposite end with the arm 13: such locking spring 29 can thus ensure that the arm 13 is maintained in the active or passive configuration.

In any case, once the arm 13 has been brought into such active configuration, should the operator subsequently succeed in freeing the working shaft 4, by removing the unwanted accumulation of material, the immediate resumption of the rotation of the working shaft 4 (consequent to the output of power, which was imprudently never shut off, by the power take-off 18) is almost instantly, and forcibly, stopped. In fact, the rotation of the disk 17 rapidly brings one of its shoulders 16 into abutment against the first end portion 13a of the arm 13, thus causing the locking of the rotation of the disk 17 and of the working shaft 4.

As previously observed, this avoids the risk that the sudden reactivation of the working shaft 4 (or of other components of the functional assemblies arranged downstream of the power take-off 18), as a consequence of removal of the jam, could cause physical (and possibly lethal) injury to the operator, since the effective restoration of normal operating conditions, and thus of the rotation of the working shaft 4, is possible only by voluntarily causing the release of the disk 17, by bringing the arm 13 from the active configuration to the passive configuration (by operating, for example, on the lever 27) and only after having cut the transmission of power from the power take-off 18.

As has been mentioned in the above paragraphs, the presence of the damping unit 12 makes it possible to avoid subjecting the disk 17 and the components downstream of the kinematic transmission chain 11 (such as the output shaft 4 and the main shaft 11a) to the sudden stresses to which they would otherwise be subjected following violent and unattenuated locking.

In fact, as a consequence of the abutment (impact) of the first end portion 13a of the arm 13 with one of the shoulders 16, the plate 14a (with the arm 13) oscillates about the second pivot 19 (while the column 21 slides progressively in the hole provided along the wing 14c) and the Belleville spring 20 automatically opposes the oscillation of the plate 14a about the second pivot 19 and of the arm 13: the arrest, at the stroke limit, is thus damped, with elastic attenuation.

It should be noted moreover that the choice to key the disk 17 immediately downstream of the power take-off 18, on the output shaft thereof, makes it possible to install the safety device 1 according to the invention at a section of the machine 2 which is typically present but unused. This makes it possible to equip existing machines 2 with safety devices 1 without necessitating laborious fine-tuning operations.

In fact, it is sufficient to install the complementary plate 14b downstream of the power take-off 18, in order to obtain a convenient reference point at which the second pivot 19 and thus the plate 14a and the disk 17 can be mounted, without, as noted in the previous paragraph, requiring complex fine-tuning.

Moreover, it should be noted that often the manufacturers of agricultural machines 2 resort to power transmission assemblies of assigned size and shape (assigned in the sense that they are provided by the manufacturers according to preset standards): in this case too, the choice to install the disk 17 (with the plate 14a and the complementary plate 14b) on the output shaft of the power assembly 18 renders the safety device 1 safely usable in such applications, thus demonstrating great versatility.

In practice it has been found that the safety device and the agricultural machine, according to the invention, fully achieve the set aim, in that the use of a stop element, moveable on command from a passive configuration, in which it is spaced from a complementary stop element which controls a working shaft of the agricultural machine, to an active configuration, in which the stop element is arranged so as to interfere with the trajectory of the complementary stop element, for the forced locking of the complementary stop element and of the working shaft, while a damping unit is capable of deadening the above-mentioned forced locking, makes it possible for an operator to safely remedy an accidental jamming of the rotating shaft, without subjecting the components of the machine to excessive stresses.

The invention, thus conceived, is susceptible of numerous modifications and variations, all of which are within the scope of the appended claims. Moreover, all the details may be substituted by other, technically equivalent elements.

Figure 13:
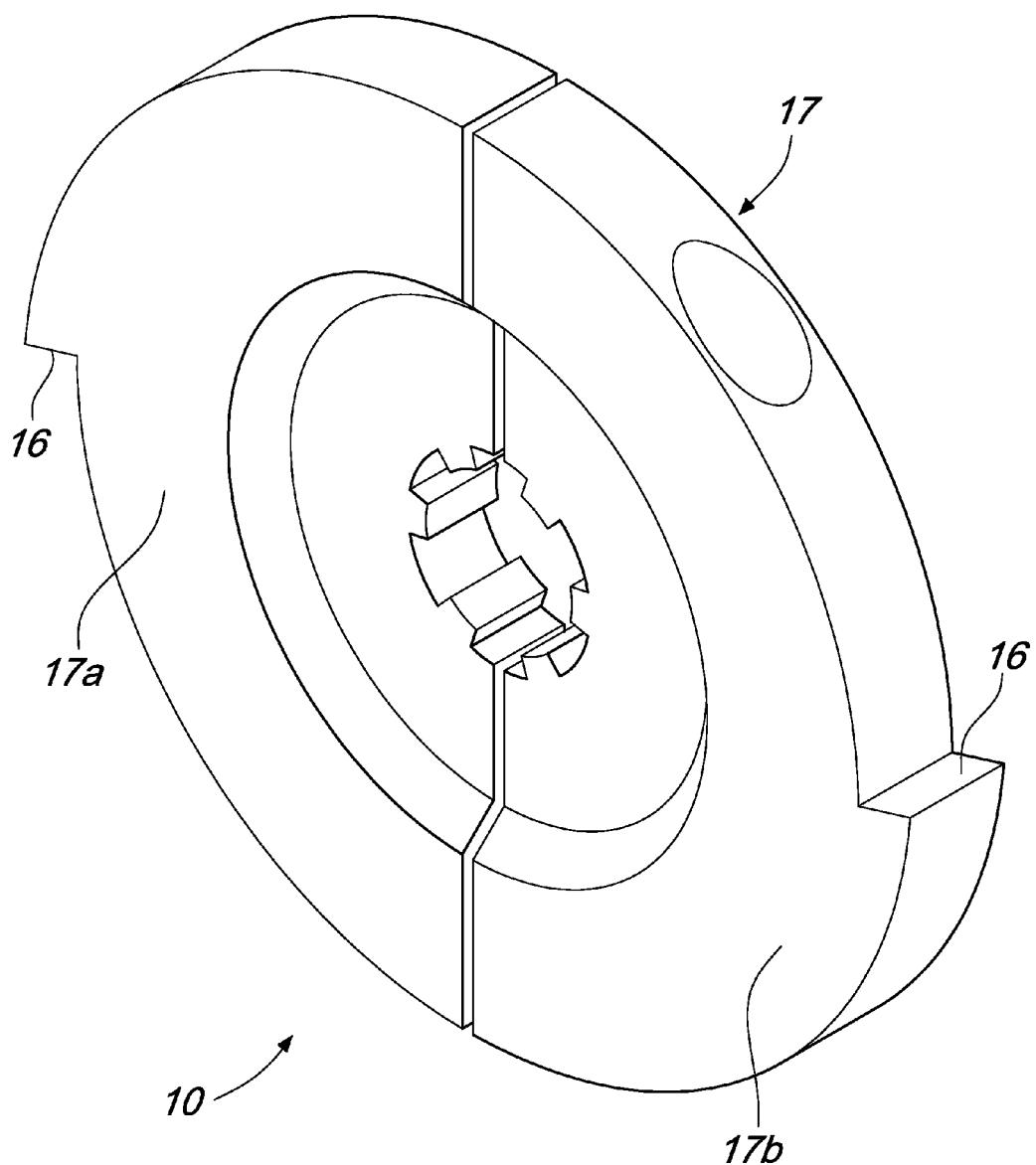
FIG. 13 is a perspective view of the complementary stop element, in a different embodiment.
Figure 16:
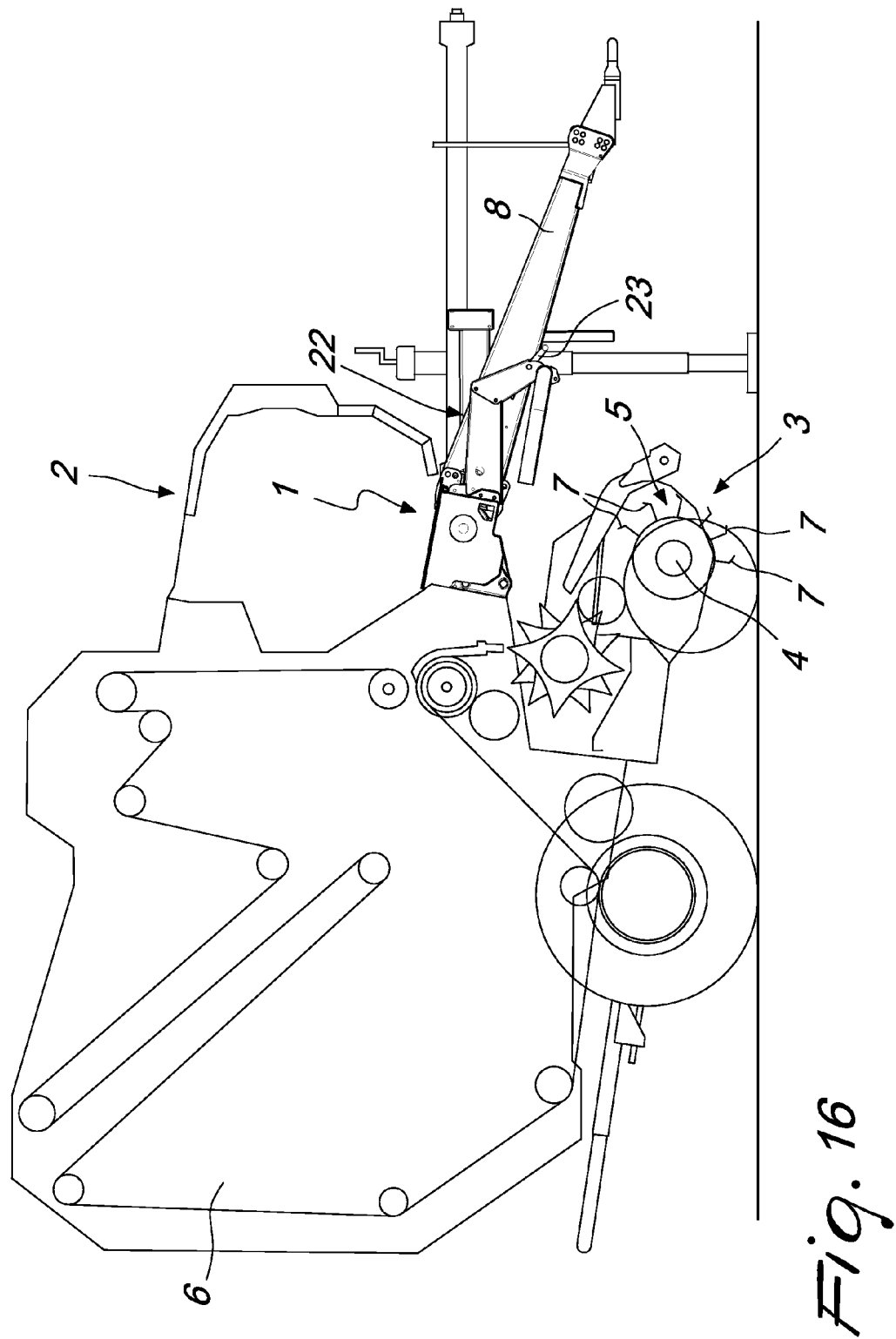
FIG. 16 is a schematic side view of the agricultural machine according to the invention.

For example, the disk 17 can be made in a single block (as in FIGS. 7 to 12), or (as illustrated in the detail shown in FIGS. 13 to 15) it can be constituted by two half-disks 17a, 17b), which can be mutually coupled on a plane that is substantially diametrical (for example by using threaded elements 17c) and are insertable in mutually aligned female screw seats provided along the mutually opposite edges of the half-disks 17a, 17b). The latter solution effectively makes it possible to protect against the danger of vibration phenomena along the kinematic chain 11 and/or affecting the disk 17 itself, and the risk that the latter could slide in an axial direction, after having keyed it on the output shaft of the power take-off 18.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. BO2011A000716 from which this application claims priority are incorporated herein by reference.

The invention claimed is:

1. A safety device for an agricultural machine provided with at least one rotating working shaft, the safety device comprising;
    a stop element and a complementary stop element, both associated functionally with a kinematic transmission chain connected to control the working shaft, wherein the stop element is movable on command from a passive configuration, in which the stop element is spaced from the complementary stop element to allow free rotation of the working shaft, to an active configuration, in which the stop element is arranged so as to interfere with the trajectory of the complementary stop element thereby locking of the complementary stop element and of the working shaft; and
    a damping unit associated with at least one of the stop element and the complementary stop element, wherein the damping unit is actuated automatically upon impact of the stop element against the complementary stop element,
    wherein the stop element comprises an arm which is articulated to a supporting plate about a first pivot for oscillation from the passive configuration, in which the arm is spaced from the complementary stop element, to the active configuration, and vice versa, wherein in the active configuration, a first end portion of the arm, which is substantially opposite to the first pivot, is arranged along the stroke of at least one shoulder, which protrudes externally from a rotating disk, which substantially constitutes the complementary stop element and is keyed on the output shaft of the power take-off of the agricultural machine, the output shaft designed to transmit motion to the working shaft,
    wherein the disk has a pair of shoulders formed by opposite parts of a circumferential edge of the disk, wherein rotation of the disk, with the arm arranged in the active configuration, moves one of the shoulders into abutment against the first end portion thereby locking the disk and the working shaft,
    wherein the supporting plate is articulated to a fixed body of the agricultural machine about a second pivot, wherein the supporting plate and the arm are pulled so as to oscillate by the disk up to a stroke limit upon an impact of one of the shoulders against the first end portion to lock the disk, wherein the damping unit comprises at least one elastic element, which is associated with the arm, the elastic reaction of the elastic element contrasting the stroke so as to attenuate locking of the working shaft and of the other functional assemblies associated with the kinematic chain and/or arranged downstream of the power take-off, and
    wherein the at least one elastic element includes at least one Belleville spring fitted along a column, wherein the column is fixed to the fixed body of the agricultural machine and is inserted slideably, at the opposite end, in a hole provided in a transverse wing that protrudes from both sides of the supporting plate.

2. A safety device for an agricultural machine provided with at least one rotating working shaft, the safety device comprising:
    a stop element and a complementary stop element both associated functionally with a kinematic transmission chain connected to control the working shaft, wherein the stop element is movable on command from a passive configuration, in which the stop element is spaced from the complementary stop element to allow free rotation of the working shaft, to an active configuration, in which the stop element is arranged so as to interfere with the trajectory of the complementary stop element thereby locking of the complementary stop element and of the working shaft;
    a damping unit associated with at least one of the stop element and the complementary stop element, wherein the damping unit is actuated automatically upon impact of the stop element against the complementary stop element; and
    an actuation element activated by an operator for the controlled transition of the stop element from the passive configuration to the active configuration,
    wherein the actuation element comprises a bar which oscillates between a first limit position and a second limit position and is arranged in front of the working shaft and parallel thereto, the bar being functionally associated, by way of respective transmission means, with the arm, wherein pressing of the bar oscillates the bar from the first limit position to the second position, causing the arm to transition from the passive configuration to the active configuration, and
    wherein the transmission means comprise a cable associated with the bar and inserted in a containment sheath, the cable being inserted in a slot which is provided in a protrusion that protrudes at right angles from the supporting plate, the sheath being fixed, at the opposite end, to a second end portion of the arm, which is opposite to the first end.

3. The safety device according to claim 2, wherein the stop element comprises an arm, which is articulated to a supporting plate about a first pivot for oscillation from the passive configuration, in which the arm is spaced from the complementary stop element, to the active configuration, and vice versa, wherein in the active configuration a first end portion of the arm, which is substantially opposite to the first pivot, is arranged along the stroke of at least one shoulder, which protrudes externally from a rotating disk, which substantially constitutes the complementary stop element and is keyed on the output shaft of the power take-off of the agricultural machine, the output shaft designed to transmit motion to the working shaft.

4. The safety device according to claim 3, wherein the disk has a pair of shoulders, which are formed by opposite parts of a circumferential edge of the disk, wherein rotation of the disk, with the arm arranged in the active configuration, moves one of the shoulders into abutment against the first end portion, with consequent forced locking of the disk and of the working shaft.

5. The safety device according to claim 4, wherein the supporting plate is articulated to a fixed body of the agricultural machine about a second pivot, wherein the supporting plate and the arm are pulled so as to oscillate by the disk up to a stroke limit, upon an impact of one of the shoulders against the first end portion to lock the disk, wherein the damping unit comprises at least one elastic element, which is associated with the arm, the elastic reaction of the elastic element contrasting the stroke so as to attenuate locking of the working shaft and of the other functional assemblies associated with the kinematic chain and/or arranged downstream of the power take-off.

6. The safety device according to claim 5, wherein the at least one elastic element comprises at least one Belleville spring, is fitted along a column, which wherein the column is fixed to the fixed body of the agricultural machine and is inserted slideably, at the opposite end, in a hole provided in a transverse wing that protrudes from both sides of the supporting plate.

7. A safety device for an agricultural machine provided with at least one rotating working shaft, the safety device comprising:
   a stop element and a complementary stop element both associated functionally with a kinematic transmission chain connected to control the working shaft, wherein the stop element is movable on command from a passive configuration, in which the stop element is spaced from the complementary stop element to allow free rotation of the working shaft, to an active configuration, in which the stop element is arranged so as to interfere with the trajectory of the complementary stop element thereby locking of the complementary stop element and of the working shaft;
   a damping unit associated with at least one of the stop element and the complementary stop element, wherein the damping unit is actuated automatically upon impact of the stop element against the complementary stop element,
   wherein the stop element comprises an arm which is articulated to a supporting late about a first pivot for oscillation from the passive configuration in which the arm is spaced from the complementary stop element, to the active configuration, and vice versa, wherein in the active configuration, a first end portion of the arm, which is substantially opposite to the first pivot, is arranged along the stroke of at least one shoulder, which protrudes externally from a rotating disk, which substantially constitutes the complementary stop element and is keyed on the output shaft of the power take-off of the agricultural machine, the output shaft being designed to transmit motion to the working shaft; and
   a lever, which protrudes transversely from the arm through a contoured guiding slot for the arm, which is provided along the supporting plate, the lever being able to be gripped manually by an operator for the transition of the arm, when the motor assembly of the agricultural machine is deactivated, from the active configuration to the passive configuration.

8. The safety device according to claim 7, further comprising an actuation element, which can be activated by an operator for the controlled transition of the stop element from the passive configuration to the active configuration.

9. The safety device according to claim 8, wherein the actuation element comprises a bar which oscillates between a first limit position and a second limit position, which can be arranged in front of the working shaft and parallel thereto, the bar being functionally associated, by way of respective transmission means, with the arm, a pressing of the bar, for its oscillation from the first limit position to the second position, causing the transition of the arm from the passive configuration to the active configuration.

10. The safety device according to claim 7, wherein the disk has a pair of shoulders formed by opposite parts a circumferential edge of the disk, wherein rotation of the disk, with the arm arranged in the active configuration, moves one of the shoulders into abutment against the first end portion, with consequent forced locking of the disk and of the working shaft.

11. The safety device according to claim 10, wherein the supporting plate is articulated to a fixed body of the agricultural machine about a second pivot, wherein the supporting plate and the arm are pulled so as to oscillate by the disk up to a stroke limit, upon an impact of one of the shoulders against the first end portion to lock the disk, wherein the damping unit comprises at least one elastic element, which is associated with the arm, the elastic reaction of the elastic element contrasting the stroke so as to attenuate locking of the working shaft and of the other functional assemblies associated with the kinematic chain and/or arranged downstream of the power take-off.

12. The safety device according to claim 11, wherein the at least one elastic element comprises at least one Belleville spring, which is fitted along a column, wherein the column is fixed to the fixed body of the agricultural machine and is inserted slideably, at the opposite end, in a hole provided in a transverse wing that protrudes from both sides of the supporting plate.

* * * * *

UNITED STATES PATENT AND TRADEMARK OFFICE
CERTIFICATE OF CORRECTION

PATENT NO.       : 9,313,955 B2
APPLICATION NO.  : 14/365827
DATED            : April 19, 2016
INVENTOR(S)      : Ravaglia et al.

It is certified that error appears in the above-identified patent and that said Letters Patent is hereby corrected as shown below:

In the claims

Column 11, Line 19, Claim 6:

After "is fitted along a column,"
Delete "which"

Signed and Sealed this
Fifth Day of July, 2016

Michelle K. Lee
*Director of the United States Patent and Trademark Office*